(12) United States Patent
Sturm et al.

(10) Patent No.: US 11,542,858 B2
(45) Date of Patent: Jan. 3, 2023

(54) CHARGE AIR COOLING UNIT FOR A TWO-STAGED TURBOCHARGER

(71) Applicant: Caterpillar Motoren GmbH & Co. KG, Kiel (DE)

(72) Inventors: Michael Sturm, Neuwittenbeck (DE); Markus Krueger, Weede (DE); Torben Gravert, Gettorf (DE); Jan Borchardt, Kiel (DE); Udo Wachtel, Schwedeneck (DE); Helge Seidel, Kiel (DE); Volker Abraham, Kiel (DE); Ole Ehlert, Tuettendorf (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 0 days.

(21) Appl. No.: 17/270,923

(22) PCT Filed: Aug. 30, 2019

(86) PCT No.: PCT/EP2019/025289
§ 371 (c)(1),
(2) Date: Feb. 24, 2021

(87) PCT Pub. No.: WO2020/048637
PCT Pub. Date: Mar. 12, 2020

(65) Prior Publication Data
US 2021/0215090 A1 Jul. 15, 2021

(30) Foreign Application Priority Data

Sep. 4, 2018 (GB) ...................................... 1814329

(51) Int. Cl.
*F02B 29/04* (2006.01)
*F02B 37/013* (2006.01)
(Continued)

(52) U.S. Cl.
CPC ...... *F02B 29/0412* (2013.01); *F02B 29/0443* (2013.01); *F02B 29/0462* (2013.01);
(Continued)

(58) Field of Classification Search
CPC ...... F02B 29/04–0493; F02B 37/00–24; F28D 2021/0082
See application file for complete search history.

(56) References Cited

U.S. PATENT DOCUMENTS 8,397,503 B2 3/2013 Niwa et al.
9,334,790 B2 5/2016 Marceno et al.
(Continued)

FOREIGN PATENT DOCUMENTS

CN 203441592 U 2/2014
EP 1111217 A2 6/2001
(Continued)

OTHER PUBLICATIONS

International Search Report related to PCT Application No. PCT/EP2019/025289 dated Dec. 4, 2019.
(Continued)

*Primary Examiner* — Laert Dounis

(57) ABSTRACT

The present invention relates to a charge air cooling unit comprising a first charge air cooler having a first end face provided with a first cooling fluid inlet and a first cooling fluid outlet and a second charge air cooler having a second end face provided with a second cooling fluid inlet and a second cooling fluid outlet. Specifically, the second charge air cooler is arranged adjacent to the first charge air cooler such that the first end face and the second end face are oriented in the same direction. Further, the charge air cooling unit comprises a manifold unit connected to the first end
(Continued)

face and the second end face for guiding a cooling fluid through the first charge air cooler and the second charge air cooler.

12 Claims, 11 Drawing Sheets

(51) Int. Cl.
    *F28F 9/02*     (2006.01)
    *F28D 7/00*     (2006.01)
    *F28D 21/00*     (2006.01)

(52) U.S. Cl.
    CPC .......... *F02B 37/013* (2013.01); *F28D 7/0066* (2013.01); *F28F 9/02* (2013.01); *F28D 2021/0082* (2013.01); *Y02T 10/12* (2013.01)

(56) References Cited

U.S. PATENT DOCUMENTS

| | | |
|---|---|---|
| 9,377,025 B2 | 6/2016 | Lee et al. |
| 9,777,619 B2 | 10/2017 | Baehr et al. |
| 2002/0011242 A1* | 1/2002 | Ruppel ................. F28D 7/0091 123/41.31 |
| 2009/0084364 A1* | 4/2009 | Martins ..................... F01P 5/08 60/599 |
| 2014/0318120 A1* | 10/2014 | Svihla ................... F02B 37/013 60/599 |
| 2015/0337714 A1 | 11/2015 | Cho et al. |
| 2017/0022884 A1* | 1/2017 | Takahata ............. F02B 29/0412 |

FOREIGN PATENT DOCUMENTS

| | | |
|---|---|---|
| EP | 2278149 A2 | 1/2011 |
| EP | 2307684 A1 | 4/2011 |
| EP | 3103985 A1 | 12/2016 |
| JP | S60101223 A | 6/1985 |
| JP | 2014141934 A | 8/2014 |
| KR | 20120111327 A | 10/2012 |
| KR | 1020160041554 A | 4/2016 |
| WO | 2016198727 A1 | 12/2016 |

OTHER PUBLICATIONS

Great Britain Search Report related to Application No. 1814329.7 dated Feb. 27, 2019.

* cited by examiner

CHARGE AIR COOLING UNIT FOR A TWO-STAGED TURBOCHARGER

This patent application is a 35 USC § 371 U.S. national stage of International Application No. PCT/EP2019/025289 filed on Aug. 30, 2019, which claims the benefit and priority of Great Britain Application No. 1814329.7 filed on Sep. 4, 2018, the disclosures of which are incorporated in their entirety by reference herein.

TECHNICAL FIELD

The present invention relates to a charge air cooling unit for a two-staged turbocharger of an internal combustion engine.

TECHNOLOGICAL BACKGROUND

For improving performance and efficiency of internal combustion engines, i.e. piston engines, turbochargers are employed which use the engine's exhaust energy to compress air intake charge. In this way, more air and proportionally more fuel can be forced into a combustion chamber, i.e. a cylinder of the engine, thereby increasing the engine's power output and efficiency. Turbochargers are usually equipped with a compressor for charging intake air which is driven by the engine's exhaust gas. For doing use, the compressor is connected to a turbine in a torque-transmitting manner, through which the engine's exhaust gas is guided.

In large turbocharged piston engines, e.g. as utilized in power plants or as main or auxiliary engines in vessels, the charging of intake air may be performed in two subsequent stages. For example, intake air, at first, may be guided through a low-pressure turbocharger unit and then through a high-pressure turbocharger unit.

In such configurations, the charge air needs to be cooled to avoid high temperatures thereof in order to increase efficiency of the process and/or to increase the charging volume forced into the cylinder. As known from EP 2 307 684 B1, this may be performed by guiding the charge air through water-cooled heat exchangers, also referred to as cooling units, after passing the respective stages of the turbocharger.

Further, in large turbocharged piston engines, the turbochargers and the charge air coolers are correspondingly large and comprise bulky connecting channels for the supply and discharge of charge air, exhaust air and cooling fluid. It is thus difficult to accommodate the turbochargers and the respective cooling units so as to provide a sufficiently compact arrangement of the engine, i.e. which allows easy installation and maintenance. This applies particularly to V-engines, in which both cylinder rows may have a low-pressure turbocharger unit, a high-pressure turbocharger unit and respective charge air coolers of their own.

SUMMARY OF THE INVENTION

It is thus an objective of the present invention to provide a charge air cooling unit for a two-staged turbocharger which contributes to an improved design of an internal combustion engine.

This objective is solved by means of a charge air cooling unit with the features of claim 1. Preferred embodiments are set forth in the present specification, the Figures as well as the dependent claims.

Accordingly, a charge air cooling unit for a two-staged turbocharger of an internal combustion engine is provided. The charge air cooling unit comprises a first charge air cooler having a first end face provided with a first cooling fluid inlet and a first cooling fluid outlet and a second charge air cooler having a second end face provided with a second cooling fluid inlet and a second cooling fluid outlet. Specifically, the second charge air cooler is arranged adjacent to the first charge air cooler such that the first end face and the second end face are oriented in the same direction. Further, the charge air cooling unit comprises a manifold unit connected to the first end face and the second end face for guiding a cooling fluid through the first charge air cooler and the second charge air cooler.

BRIEF DESCRIPTION OF THE DRAWINGS

The present disclosure will be more readily appreciated by reference to the following detailed description when being considered in connection with the accompanying drawings in which.

DETAILED DESCRIPTION

Figure 1:
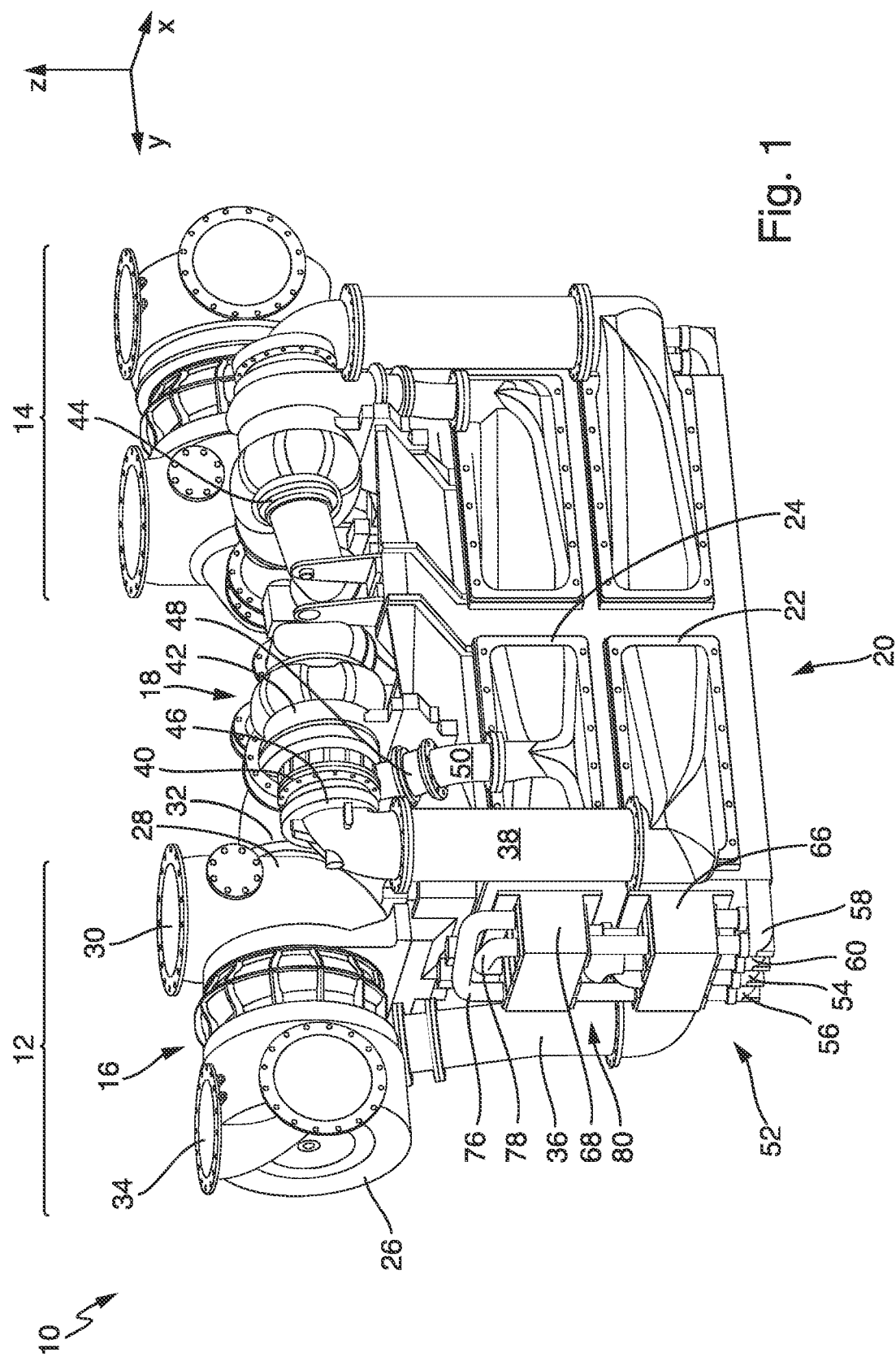
FIG. 1 shows a schematic perspective view of a two-staged turbocharger of an internal combustion engine.

In the following, the invention will be explained in more detail with reference to the accompanying Figures, in which like elements are denoted by identical reference numerals and repeated description thereof may be omitted in order to avoid redundancies.

FIG. 1 shows a two-staged turbocharger 10 of an internal combustion engine in an uninstalled state, i.e. in which the turbocharger 10 is not fastened to the engine. Specifically, the shown turbocharger 10 is provided for a large turbocharged piston V-engine, for example, as utilized in power plants or in vessels as a main or auxiliary engine.

Although the proposed charge air cooling unit is described in the following with reference to its employment in the two-staged turbocharger 10 of a large turbocharged piston V-engine, a skilled person will understand that the proposed charge air cooling unit is not limited to this particular application. Rather, it will be obvious to the skilled person that the proposed charge air cooling unit may be employed in any suitable turbocharger or any suitable turbocharged internal combustion engine.

The two-staged turbocharger 10 is configured to be disposed between cylinder rows of the V-engine and comprises a first portion 12 and a second portion 14 which are associated to different cylinder rows of the V-engine. In other words, the first portion 12 is configured to charge intake air to be supplied to one cylinder row, wherein the second portion 14 is configured to charge intake air to be supplied to the other cylinder row. The first portion 12 and the second portion 14 are built mirror-inverted. This means that the first portion 12 and the second portion 14 are equipped with components which, apart from their orientation, are structurally and functionally identical.

In the following, the configuration of the first portion 12 is further specified which accordingly applies to the second portion 14. Thus, each component referred to in the following in connection with the first portion 12 is accordingly provided in the second portion 14 of the turbocharger 10 and repeated description thereof is omitted in order to avoid redundancies.

Each of the first and the second portion 12, 14 of the turbocharger 10 is configured to charge or compress intake air of the engine in two subsequent stages, i.e. in a low-pressure turbocharger stage and a high-pressure turbocharger stage. For doing so, the first portion 12 of the turbocharger 10 comprises a low-pressure turbocharger unit 16 and a high-pressure turbocharger unit 18, through which the intake air is subsequently guided and successively compressed or charged and thereby heated.

In order to prevent the intake air from being subjected to excessively high temperatures, the first portion 12 further comprises a charge air cooling unit 20, through which the charge air output from the low-pressure and the high-pressure turbocharger unit 16, 18 is guided to be cooled. Specifically, the charge air cooling unit 20 comprises a first charge air cooler 22 associated to the low-pressure turbocharger unit 16 and a second charge air cooler 24 associated to the high-pressure turbocharger unit 18. Specifically, the first charge air cooler 22 is disposed downstream of the low-pressure turbocharger unit 16 and upstream of the high-pressure turbocharger unit 18, wherein the second charge air cooler 24 is disposed downstream of the high-pressure turbocharger unit 18. In this context, the terms "downstream" and "upstream" refer to a flow direction of the charge air flowing through the first portion 12. The first and the second charge air cooler 22, 24 are provided in the form of fluid-cooled heat exchangers.

In the following, the structural arrangement and the function of the respective turbocharger units 16, 18 as well as the first and the second charge air cooler 22, 24 are further specified.

The low-pressure turbocharger unit 16 comprises a compressor accommodated in a compressor housing 26 which is driven by a turbine accommodated in a turbine housing 28, wherein the turbine and the compressor are connected in a torque-transmitting manner. The turbine housing 28 comprises an exhaust gas inlet opening 30 for supplying exhaust gas of the engine into the turbine housing 28 and an exhaust gas outlet opening 32 for discharging exhaust gas from the turbine housing 28. In this way, exhaust gas of the engine can be guided through the turbine housing 28, thereby driving the turbine and consequently the compressor of the low-pressure turbocharger unit 16. As a result, i.e. by driving the compressor, intake air is subsequently suctioned into the compressor housing 26 via a charge air inlet opening 34, charged or compressed by the compressor and thereby heated, and then discharged from the compressor housing 26 via a charge air outlet opening (not shown). After passing the low-pressure turbocharger unit 16, the charge air discharged via the charge air outlet opening is supplied to the first charge air cooler 22 via a first charge air supply line 36 and guided therethrough so as to be cooled.

Thereafter, charge air discharged from the first charge air cooler 22 is supplied to the high-pressure turbocharger unit 18 via a second charge air supply line 38.

The high-pressure turbocharger unit 18 comprises a compressor accommodated in a compressor housing 40 which is driven by a turbine accommodated in a turbine housing 42, wherein the turbine and the compressor are connected in a torque-transmitting manner. The turbine housing 42 comprises an exhaust gas inlet opening for supplying exhaust gas discharged from the turbine housing 28 of the low-pressure turbocharger unit 16 into the turbine housing 42 and an exhaust gas outlet opening 44 for discharging exhaust gas from the turbine housing 42. In this way, exhaust gas of the engine can be guided through the turbine housing 42, thereby driving the turbine and consequently the compressor of the high-pressure turbocharger unit 18. As a result, i.e. by driving the compressor, intake air is subsequently suctioned into the compressor housing 40 via a charge air inlet opening 46, further charged or compressed by the compressor to a higher pressure level and thereby heated, and then discharged from the compressor housing 40 via a charge air outlet opening 48.

Thereafter, charge air discharged from the high-pressure turbocharger unit 18 is supplied to the second charge air cooler 24 via a third charge air supply line 50 and guided therethrough so as to be cooled. After passing the second charge air cooler 24, the cooled charge air is forced into the cylinders of the engine.

The first charge air cooler 22 and the second charge air cooler 24 are arranged adjacent to one another. In the context of the present disclosure, this means that the first charge air cooler 22 and the second charge air cooler may be arranged, for example, next to or above one another. This, however, does not require that the first charge air cooler 22 and the second charge air cooler 24 lie against each other. Rather, in this context, the first charge air cooler and the second charge air cooler may be arranged spaced apart or close together. Of course, the first charge air cooler 22 and the second charge air cooler 24 may also lie against each other.

Specifically, as can be gathered from FIG. 1, the first charge air cooler 22 and the second charge air cooler 24 are provided in a stacked arrangement such that the second charge air cooler 24 is stacked or arranged onto the first charge air cooler 22. In other words, this means that, in an installed state, in which the charge air cooling unit 20 together with the two-stage turbocharger 10 is installed on the engine, the first charge air cooler 22 and the second charge air cooler 24 are disposed one above the other along a height axis Z of the engine.

Alternatively, the first charge air cooler 22 and the second charge air cooler 24 may be disposed next to each other along an axis perpendicular to the height axis Z of the engine in the installed state, for example, along a longitudinal axis X or a transverse axis Y of the engine.

Further, the first charge air cooler 22 and the second charge air cooler 24 are arranged in parallel relative to one another.

As set forth above, charge air is subsequently guided through the first charge air cooler 22 and the second charge air cooler 24. In particular, in the stacked arrangement of the first and the second charge air cooler 22, 24, a first charge air stream is guided through the first charge air cooler 24 and a second charge air stream is guided through the second charge air cooler 24, wherein the first charge air stream flows through the first charge air cooler 22 in a direction opposite to a flow direction of the second charge air stream through the second charge air cooler 24. In other words, the charge air flow direction among the first and the second charge air cooler 22, 24 is reversed.

The first charge air cooler 22 and the second charge air cooler 24 are configured to transfer cooling energy from the cooling fluid to the charge air. This is realized by guiding both the cooling fluid and the charge air through the respective charge air coolers 22, 24, i.e. through heat exchangers accommodated therein. In this way, a heat transfer between the cooling fluid and the charge air is enabled. The cooling fluid flowing through the first charge air cooler 22 and the second charge air cooler 24 may be any suitable cooling medium capable of providing cooling energy. Specifically, the cooling fluid may be water.

In the shown charge air cooling unit 20, each of the first and the second charge air cooler 22, 24 is configured to cool charge air flowing therethrough into subsequent stages. Specifically, this is realized by guiding the charge air, at first, through a first heat exchanger and subsequently to a second heat exchanger within each of the first and the second charge air cooler 22, 24. More specifically, the first heat exchanger is fed by a first cooling fluid and the second heat exchanger is fed by a second cooling fluid. In this configuration, the first cooling fluid has a temperature higher than a temperature of the second cooling fluid. In this way, an effective and efficient cooling of charge air may be provided. The first cooling fluid and the second cooling fluid circulate through separate cooling cycles and are guided through the first and the second charge air cooler 22, 24 in parallel.

For circulating the first and the second cooling fluid through the first charge air cooler 22 and the second charge air cooler 24, the charge air cooling unit 20 further comprises a manifold unit 52. Specifically, as can be gathered from FIG. 1, the first cooling fluid is supplied to and discharged from the manifold unit 52 by means of a first cooling fluid supply line 54 and a first cooling fluid discharge line 56. Accordingly, the second cooling fluid is supplied to and discharged from the manifold unit 52 by means of a second cooling fluid supply line 58 and a second cooling fluid discharge line 60.

In the following, the manifold unit 52 is further specified by reference to FIGS. 2 to 4. For guiding the respective cooling fluids through the first and the second charge air cooler 22, 24, the manifold unit 52 is connected to a first end face 62 of the first charge air cooler 22 and to a second end face 64 of the second charge air cooler 24.

Figure 4:
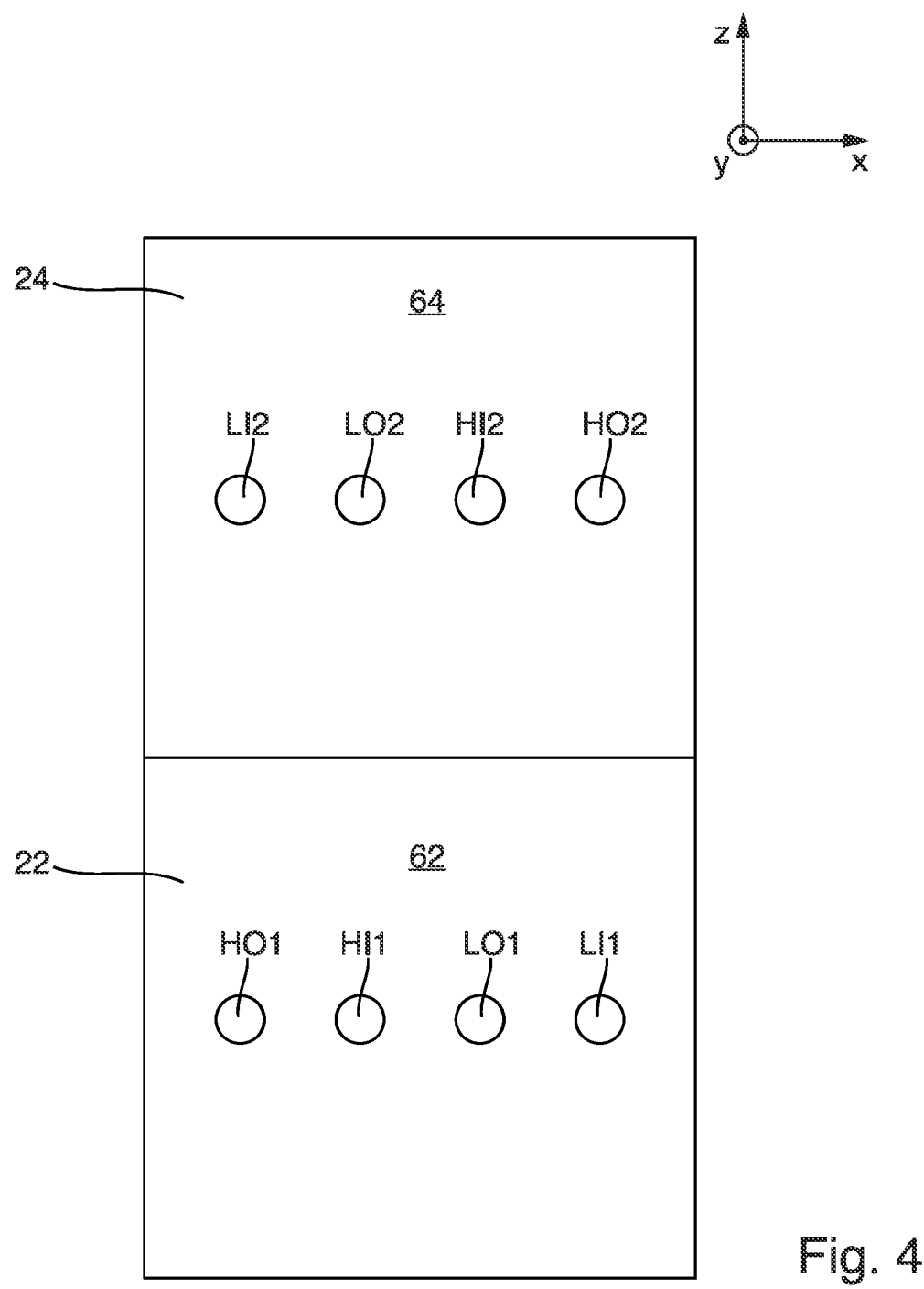
FIG. 4 shows a schematic front view of an assembly constituted by a first and a second charge air cooler employed in the charge air cooling unit depicted in FIGS. 2 and 3 in an uninstalled state.
Figure 5:
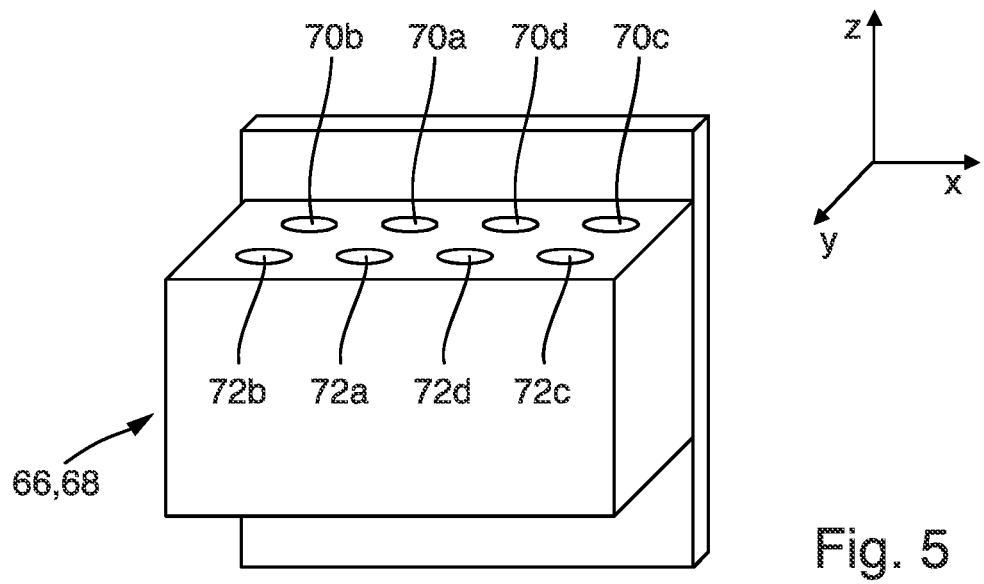
FIG. 5 shows a schematic perspective view of a manifold employed in the charge air cooling unit depicted in FIGS. 2 and 3 in an uninstalled state.
Figure 6:
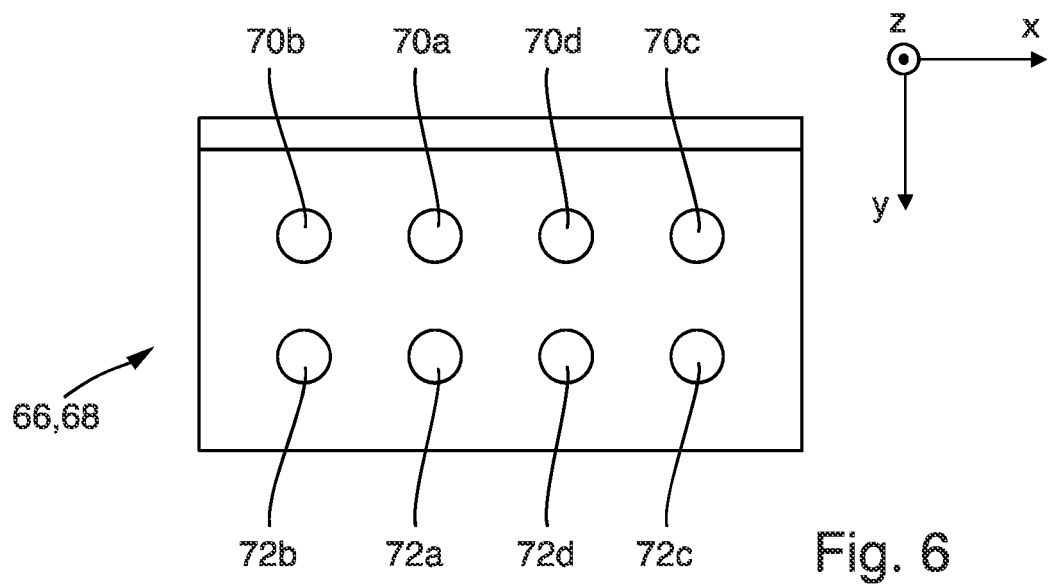
FIG. 6 shows a schematic top view of the manifold depicted in FIG. 5.
Figure 7:
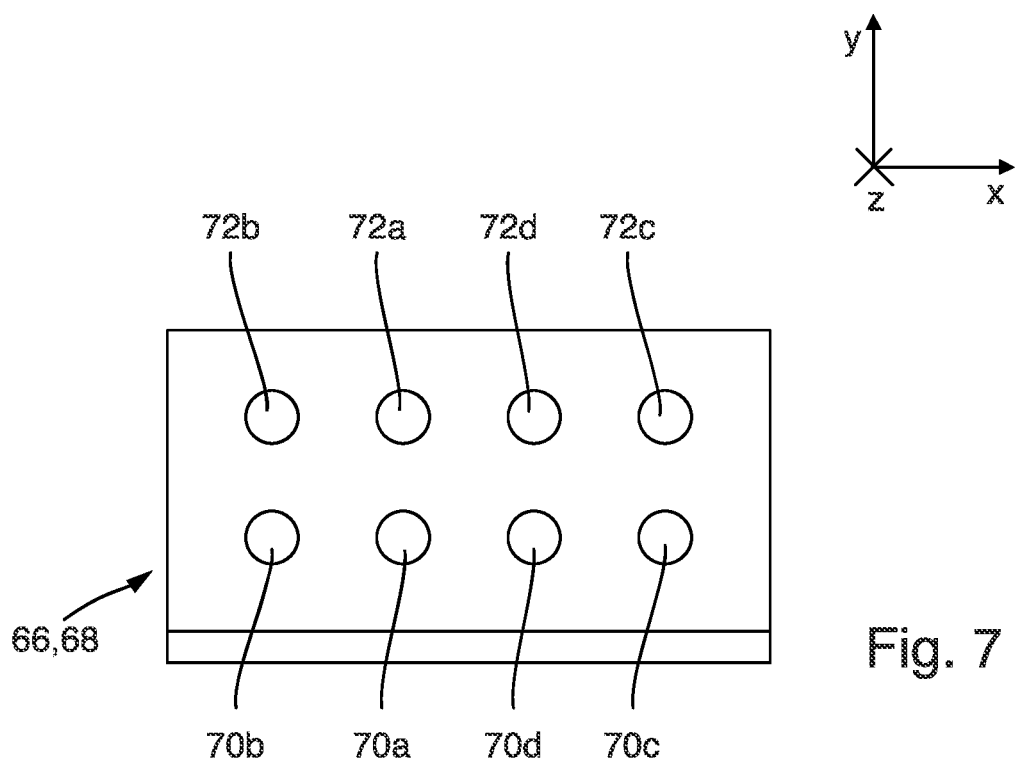
FIG. 7 shows a schematic view from beneath of the manifold depicted in FIGS. 5 and 6.
Figure 8:
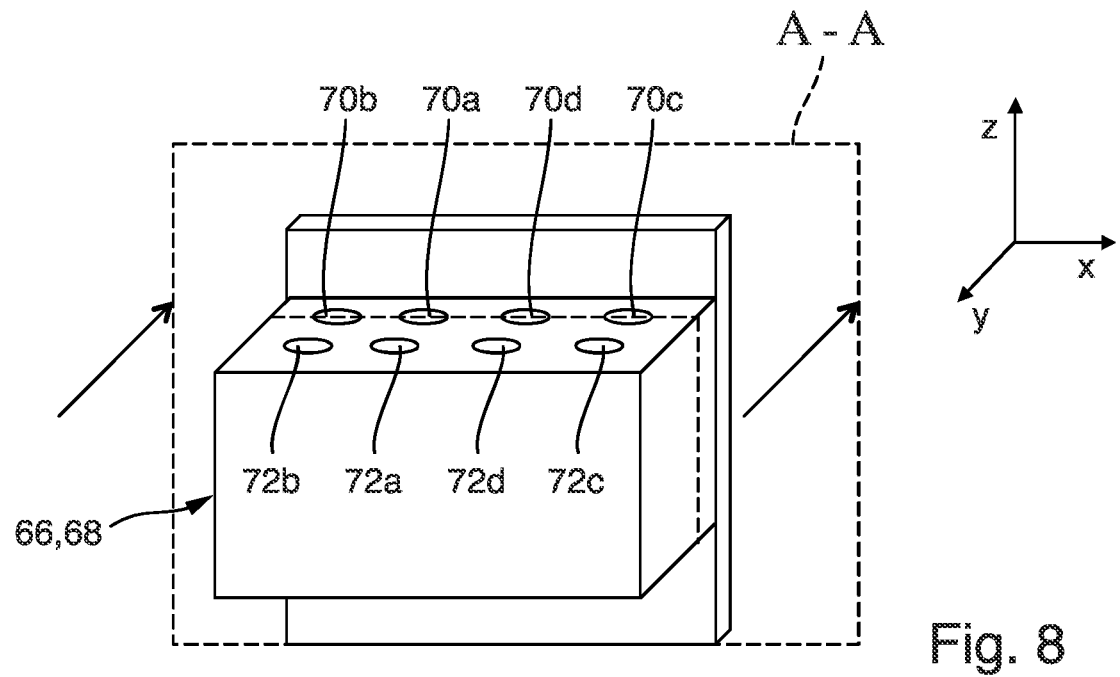
FIG. 8 shows the schematic perspective view of the manifold illustrating a longitudinal section plane A-A.
Figure 9:
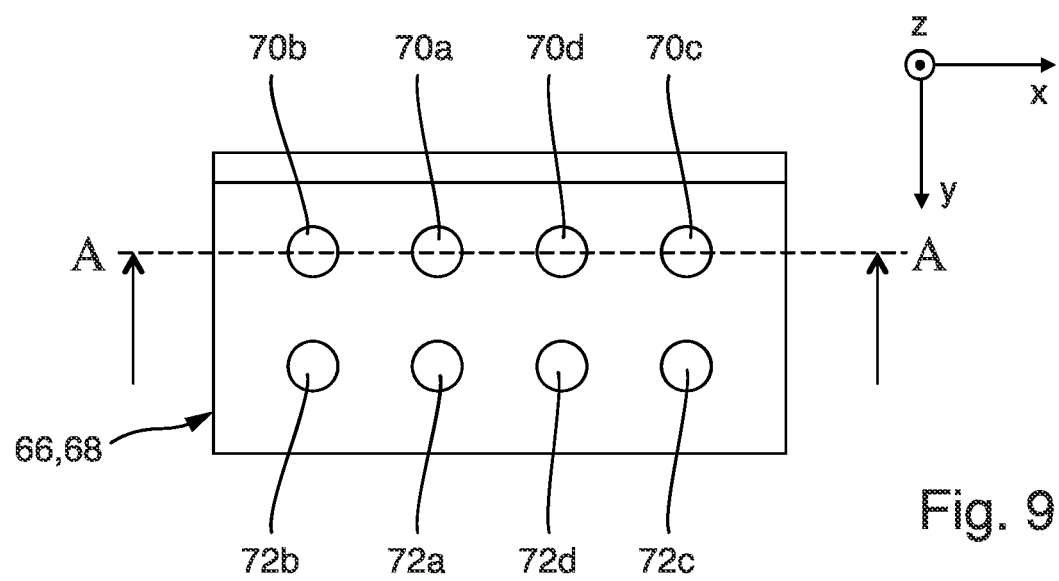
FIG. 9 shows the schematic top view of the manifold illustrating the section plane A-A.
Figure 10:
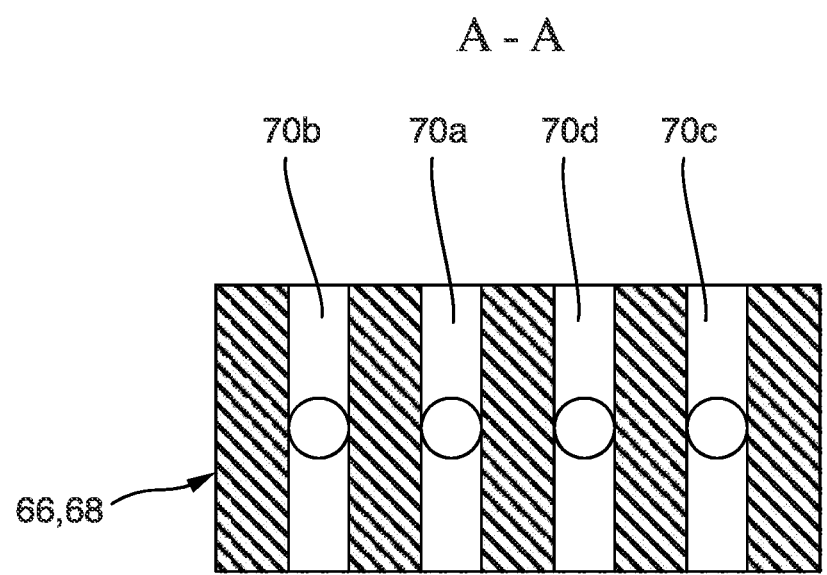
FIG. 10 shows a cross-sectional view on the manifold along the section plane A-A depicted in FIGS. 8 and 9.
Figure 11:
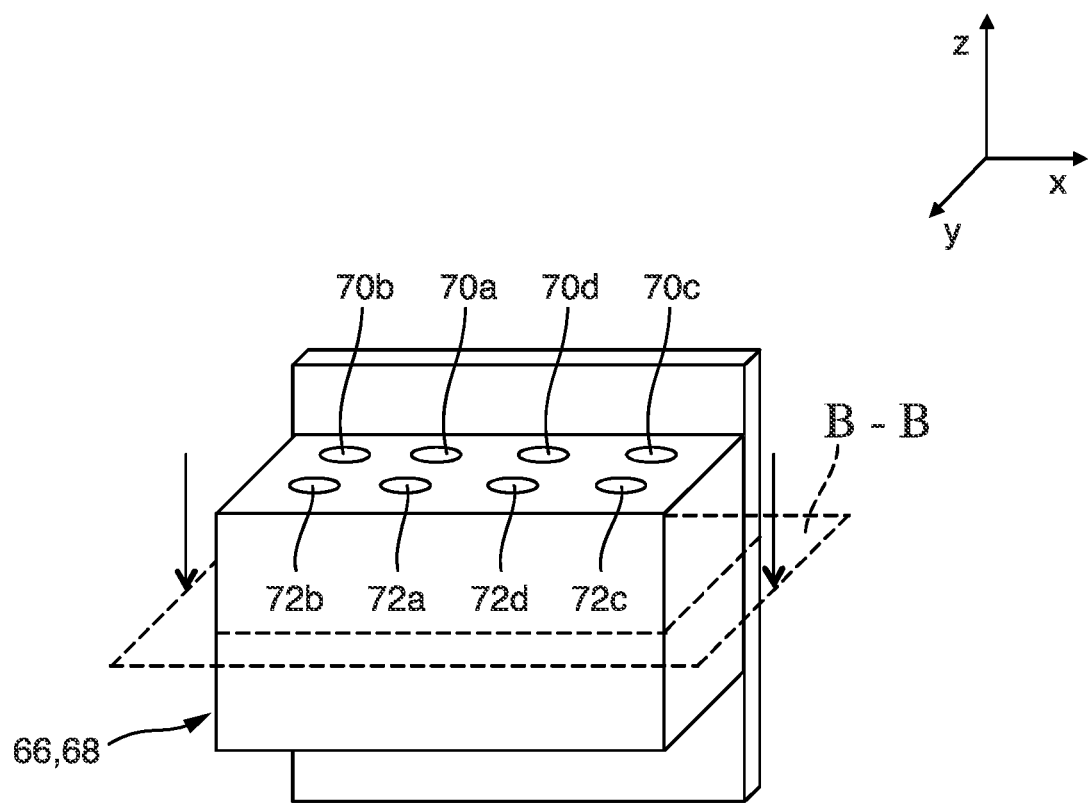
FIG. 11 shows the schematic perspective view of the manifold illustrating a transversal section plane B-B.
Figure 12:
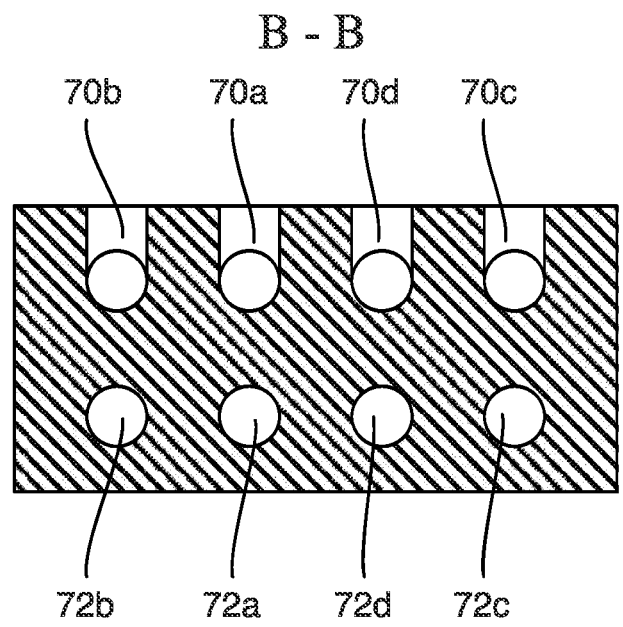
FIG. 12 shows a cross-sectional view on the manifold along the section plane B-B depicted in FIG. 11.

FIG. 4 shows a front view on the first and the second charge air cooler 22, 24, i.e. the first and the second end face 62, 64, which are illustrated in a uninstalled state, in which the manifold unit is not fastened or connected thereto. For supplying the respective cooling fluids to and discharging the same from the first and the second charge air cooling unit 22, 24, each of the first and the second end face 62, 64 is provided with two cooling fluid inlets and two cooling fluid outlets.

More specifically, for guiding the first cooling fluid, i.e. having a higher temperature compared to the second cooling fluid, into the respective charge air coolers, the first end face 62 is provided with a first cooling fluid inlet HI1 and a first cooling fluid outlet HO1. Accordingly, the second end face 64 is provided with a second cooling fluid inlet HI2 and a second cooling fluid outlet HO2.

Further, for guiding the second cooling fluid, i.e. having a higher temperature compared to the first cooling fluid, into the respective charge air coolers, the first end face 62 is further provided with a third cooling fluid inlet LI1 and a third cooling fluid outlet LO1, wherein the second end face 64 is provided with a fourth cooling fluid inlet LI2 and a fourth cooling fluid outlet LO2.

In the above mentioned reference signs indicating the respective cooling fluid inlets and outlets of the first and the second charge air cooler 22, 24, the first character indicates whether the aperture refers to the first cooling fluid having a higher temperature "H" or to the second cooling fluid having a lower temperature "L", the second character indicates whether it refers to an inlet "I" or an outlet "O" for the fluid, and the third character indicates whether it refers to the first charge air cooler "1" or to the second charge air cooler "2".

As can be gathered from FIG. 4, the arrangement of the respective inlets and outlets for the cooling fluids along the longitudinal direction X is reversed among the different charge air coolers 22, 24. This is due to the fact that the flow direction of the charge air stream flowing through the first charge air cooler 22 is reversed with respect to the flow direction of the charge air flowing through the second charge air cooler 24. In this way, in both charge air coolers 22, 24, the charge air is, at first, subjected to a heat transfer to the first fluid and thereafter to the second fluid.

In the proposed configuration, the first charge air cooler 22 and the second charge air cooler 24 are arranged such that the first end face 62 of the first charge air cooler 22 and the second end face 64 of the second charge air cooler 24 are oriented in the same direction. In the context of the present disclosure, this may mean that at least one directional component of a surface normal of the first end face 62 and a directional component of a surface normal of the second end face 64 point in the same direction. In other words, the surface normal of the first end face 62 does not point away from the surface normal of the second interface 64. In the shown configuration, the surface normal of the first end face 62 and the surface normal of the second end face 64 are disposed in parallel to one another. Further, the first end face 62 and/or the second end face 64 are planar, but may also be at least partially curved.

The first and the second charge air cooler 22, 24 constitute an assembly, wherein the first and the second end face 62, 64, to which the manifold unit 52 is connected, form a side face of the assembly. Specifically, the first end face 62 and the second end face 64 form an outer surface of the assembly and are arranged adjacent to one another. Further, the first end face 62 is oriented in a direction away from the second charge air cooler 24 and the second end face 64 is oriented in a direction away from the first charge air cooler 22.

Figure 2:
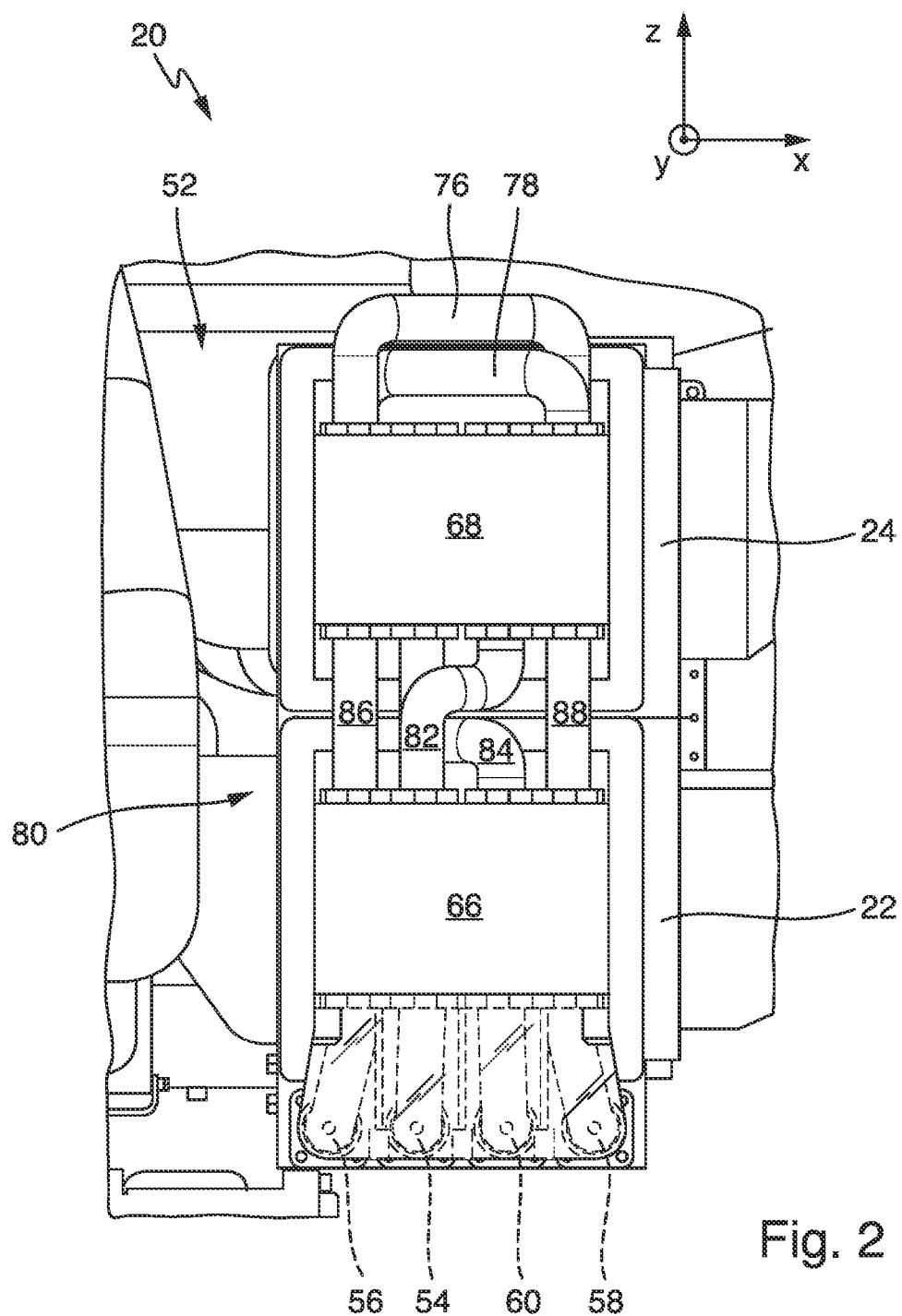
FIG. 2 shows a schematic front view of a charge air cooling unit employed in the two-staged turbocharger depicted in FIG. 1.
Figure 3:
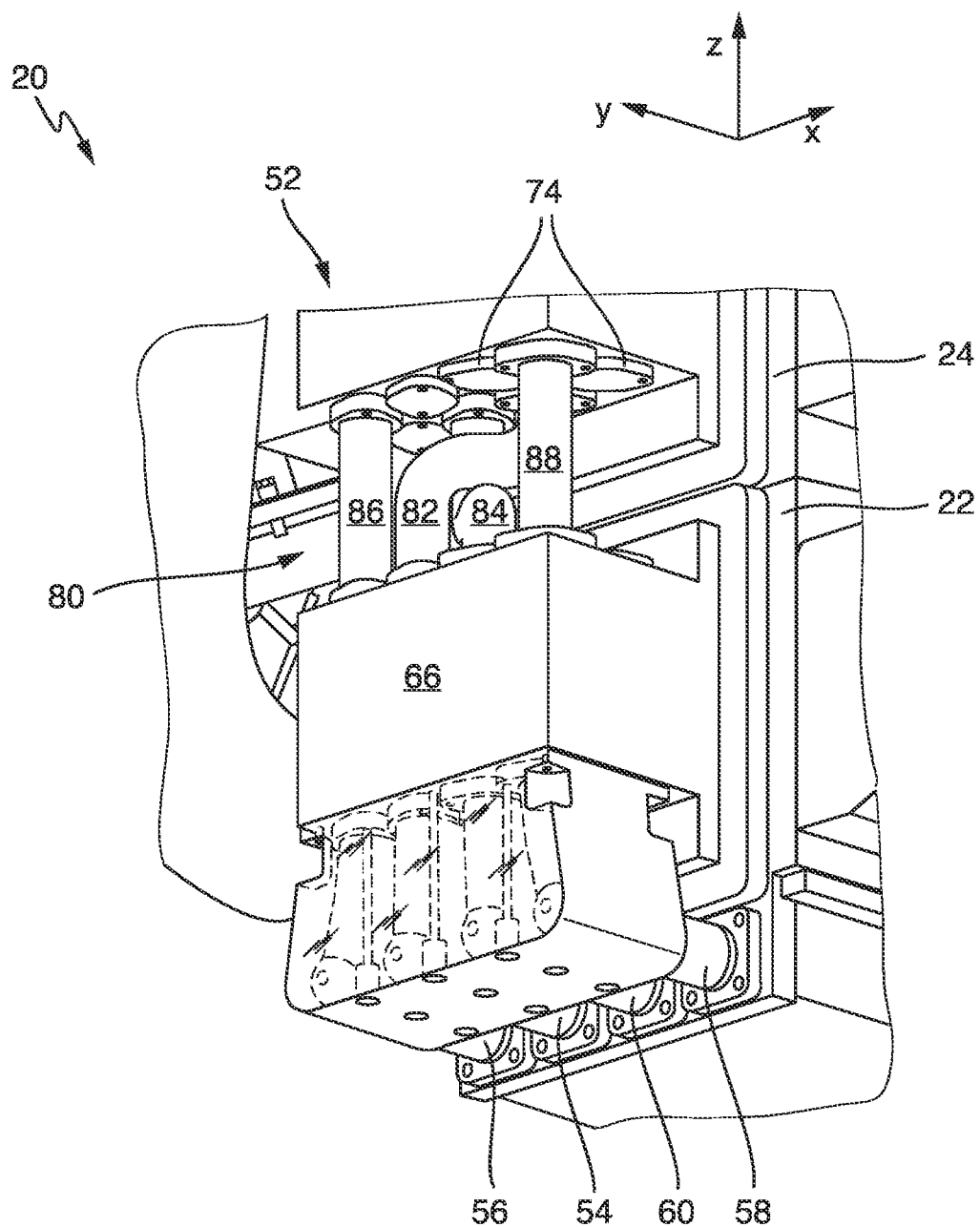
FIG. 3 shows a schematic perspective view of the charge air cooling unit of the two-staged turbocharger.

As depicted in FIGS. 2 and 3, the manifold unit 52 comprises a first manifold 66 connected to the first end face 62 of the first charge air cooler 22 and a second manifold 68 connected to the second end face 64 of the second charge air cooler 24.

Specifically, the first manifold 66 is configured to guide the first cooling fluid supplied by the first cooling fluid supply line 54 into the first cooling fluid inlet HI1 of the first charge air cooler 22 and to guide the first cooling fluid discharged from the first cooling fluid outlet HO1 toward the first cooling fluid discharge line 56. Further, the first manifold 66 is further configured to guide the second cooling fluid supplied by the second cooling fluid supply line 58 to the third cooling fluid inlet LI1 and to guide the second cooling fluid discharged from the third cooling fluid outlet LO1 toward the second cooling fluid discharge line 60.

To that end, the first manifold 66 is further configured to guide the first cooling fluid supplied by the first cooling fluid supply line 54 toward the second charge air cooler 24, in particular the second cooling fluid inlet HI2, and to guide the first cooling fluid discharged from the second charge air cooler 24, in particular from the second cooling fluid outlet HO2, toward the first cooling fluid discharge line 56. The first manifold 66 is further configured to guide the second cooling fluid supplied by the second cooling fluid supply line 58 toward the second charge air cooler 24, in particular the fourth cooling fluid inlet LI2, and to guide the second cooling fluid discharged from the second charge air cooler 24, in particular the fourth cooling fluid outlet LO2, toward the second cooling fluid discharge line 60.

The second manifold 68 is configured to guide the first cooling fluid supplied by the first cooling fluid supply line 54 to the second cooling fluid inlet HI2 and to guide the first cooling fluid discharged from the second cooling fluid outlet HO2 toward the first cooling fluid discharge line 56. Further, the second manifold 68 is configured to guide the second cooling fluid supplied by the second cooling fluid supply line 58 to the fourth cooling fluid inlet LI2 and to guide the second cooling fluid discharged from the second cooling fluid outlet LO2 toward the second cooling fluid discharge line 60.

In the following, by reference to FIGS. 5 to 15, the structural arrangement of the first and the second manifold 66, 68 is further specified. Specifically, each of FIGS. 5 to 15 shows the first and the second manifold 66, 68, which are identical in construction. Specifically, the first and the second manifold 66, 68 are shown in an uninstalled state, in which they are disassembled from the manifold unit 52.

Each of the first and the second manifold 66, 68, comprises first to fourth supply channels 70a to 70d and first to fourth transition channels 72a to 72d.

Specifically, as depicted in FIGS. 8 to 12, each of the supply channels 70a to 70d is provided in the form of a T-piece channel having three openings. In the installed state of the first and the second manifold 66, 68, as depicted in FIGS. 1 to 3, one of the three openings is closed by means of a sealing cap 74, as illustrated in FIG. 3.

Figure 13:
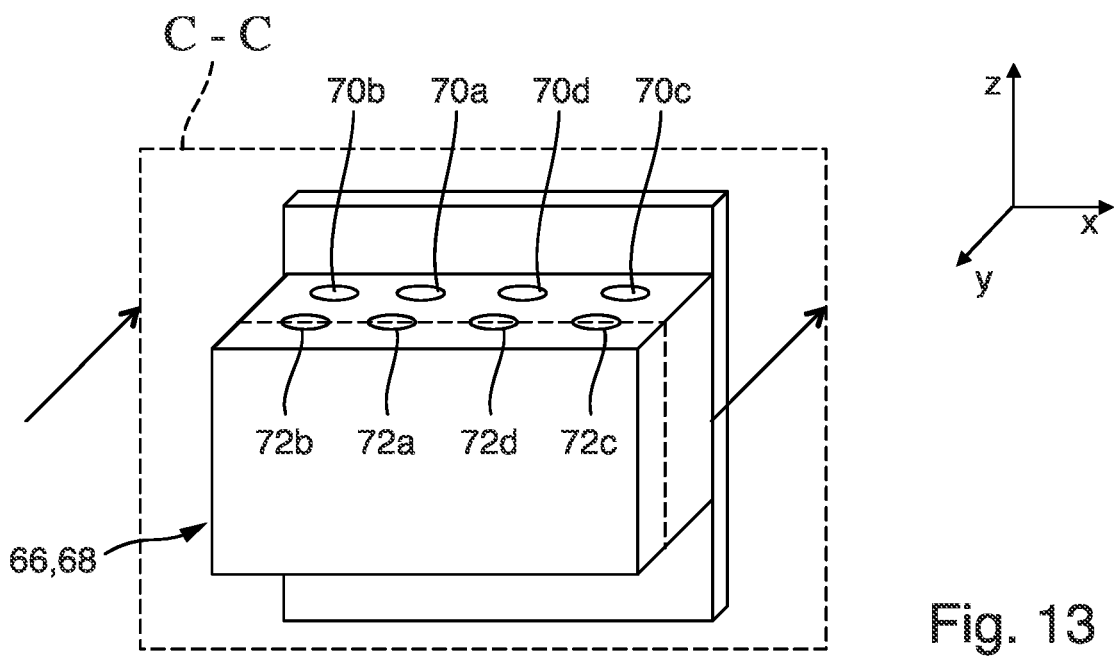
FIG. 13 shows the schematic perspective view of the manifold illustrating a longitudinal section plane C-C.
Figure 14:
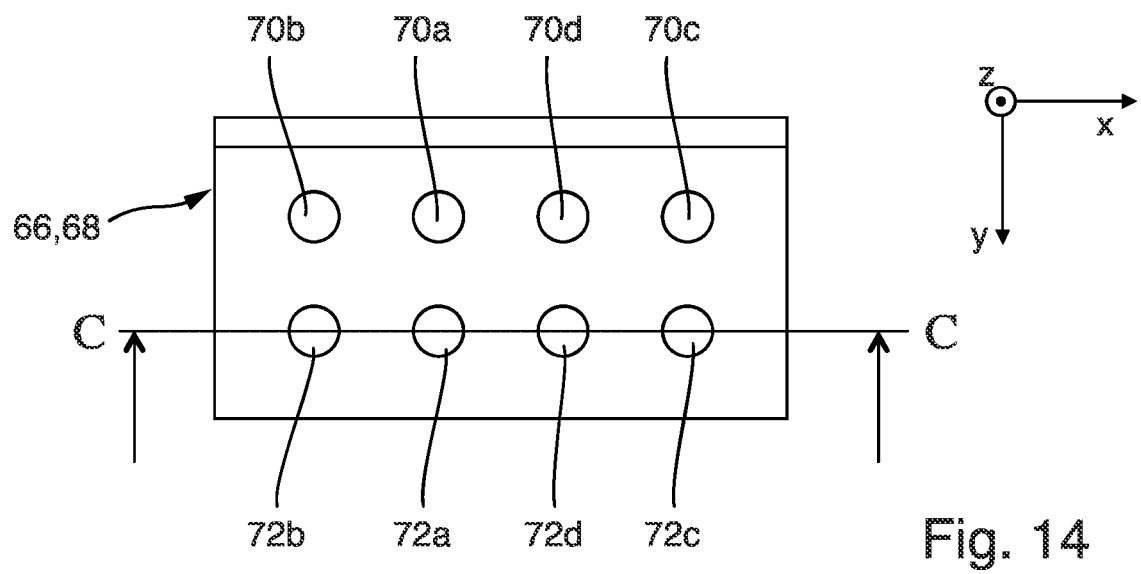
FIG. 14 shows the schematic top view of the manifold illustrating the section plane C-C.
Figure 15:
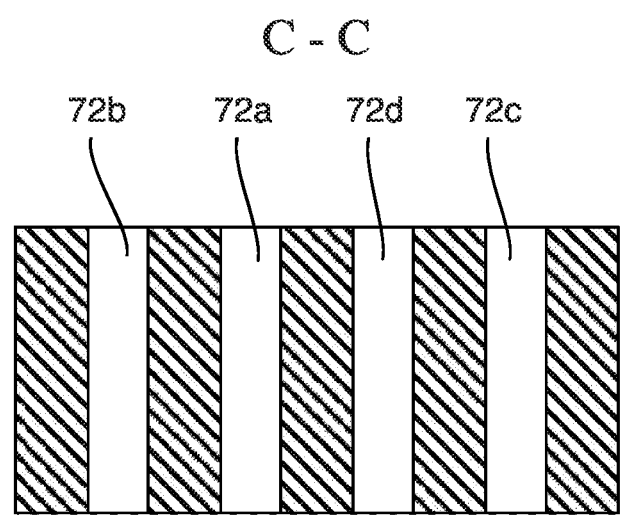
FIG. 15 shows a cross-sectional view on the manifold along the section plane C-C depicted in FIGS. 13 and 14.

As can be gathered from FIGS. 13 to 15, by contrast, each of the transition channels 72a to 72d are provided in the form of straight channels.

The first and the second manifold 66, 68 are configured such that the supply channels 70a to 70d extend along a first plane A-A and the transition channels 72a to 72d extend along a second plane C-C, wherein, in the installed state, the first plane A-A is arranged closer to the first and/or second end face 62, 64 compared to the second plane C-C.

In the following, it is referred to the first manifold 66, wherein, in an installed state thereof, i.e. as depicted in FIGS. 1 to 3, the first supply channel 70a is configured to guide the first cooling fluid supplied to the first manifold 66 from the first cooling fluid supply line 54 to the first cooling fluid inlet HI1. The second supply channel 70b is configured to guide the first cooling fluid discharged from the first cooling fluid outlet HO1 to the first cooling fluid discharge line 56. The third supply channel 70c is configured to guide the second cooling fluid supplied to the first manifold 66 from the second cooling fluid supply line 58 to the third cooling fluid inlet LI1. The fourth supply channel 70d is configured to guide the second cooling fluid discharged from the third cooling fluid outlet LO1 to the second cooling fluid discharge line 60. In the first manifold 66, an upper opening, i.e. provided on a top surface of the first manifold 66, of each one of the first to fourth supply channels 70a to 70d is closed or sealed by means of a sealing cap 74, respectively.

Further, the first transition channel 72a is configured to guide the first cooling fluid supplied to the first manifold 66 from the first cooling fluid supply line 54 to the second manifold 68. The second transition channel 72b is configured to guide the first cooling fluid discharged from the second manifold 68 to the first cooling fluid discharge line 56. The first transition channel 72c is configured to guide the second cooling fluid supplied to the first manifold 66 from the second cooling fluid supply line 58 to the second manifold 68. The fourth transition channel 72d is configured to guide the second cooling fluid discharged from the second manifold 68 to the second cooling fluid discharge line 60.

In the following, it is referred to the second manifold 68, wherein, in an installed state thereof, i.e. as depicted in FIGS. 1 to 3, the first supply channel 70a is configured to guide the first cooling fluid discharged from the fourth cooling fluid outlet LO2 to the second cooling fluid discharge line 60, i.e. via the fourth transition channel 72d of the first manifold 66. The second supply channel 70b is configured to supply the second cooling fluid supplied to the second manifold 68 via the third transition channel 72c of the first manifold 66, to the fourth cooling fluid inlet LI2. The third supply channel 70c is configured to guide the first cooling fluid discharged from the second cooling fluid outlet HO2 to the first cooling fluid discharge line 56, i.e. via the second transition channel 72b of the first manifold 66. The fourth supply channel 70d is configured to supply the first cooling fluid supplied to the second manifold 68, via the first transition channel 72a of the first manifold 66, to the third cooling fluid inlet HI2.

In this configuration of the second manifold 68, an upper opening, i.e. provided on a top surface of the second manifold 68, of the first and fourth supply channel 70a, 70d and a lower opening, i.e. provided on a bottom surface of the second manifold 68, of the second and third supply channel 70a, 70d is closed or sealed by means of a sealing cap 74, respectively.

Further, the second transition channel 72b is configured to guide the first cooling fluid discharged from the second cooling fluid outlet HO2 toward the first manifold 66. For doing so, the upper opening of the third supply channel 70c is fluid-communicatively connected to an upper opening of the second transition channel 72b by means of a U-shaped connecting pipe 76, as depicted in FIG. 2. The third transition channel 72c is configured to supply the second cooling fluid supplied to the second manifold 68, i.e. via the third transition channel 72c of the first manifold 66, to the second supply channel 70b. For doing so, an upper opening of the third transition channel 72c is fluid-communicatively connected to an upper opening of the second supply channel 70b by means of a further U-shaped connecting pipe 78, as depicted in FIG. 2.

In addition, as can be gathered from FIGS. 2 and 3, the charge air cooling unit 20 comprises a connecting portion 80 disposed between the first and the second manifold 66, 68. Specifically, the connecting portion 80 comprises a first connecting line 82 for fluid-communicatively connecting the first transition channel 72a of the first manifold 66 to the fourth supply channel 70d of the second manifold 68, a second connecting line 84 for fluid-communicatively connecting the first supply channel 70a of the second manifold 68 to the fourth transition channel 72d of the first manifold 66. In this configuration, the first connecting line 82 and the second connecting line 84 are provided in the form of curved pipes, i.e. double curved pipes. Further, the connecting portion 80 comprises a third connecting line 86 for fluid-communicatively connecting the second transition channel 72b of the first manifold 66 to the second transition channel 72b of the second manifold 68 and a fourth connecting line 88 four fluid-communicatively connected the third transition channel 72c of the first manifold 66 to the third transition channel 72c of the second manifold 68.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A charge air cooling unit for a two-staged turbocharger of an internal combustion engine may be provided. The charge air cooling unit may comprise a first charge air cooler having a first end face provided with a first cooling fluid inlet and a first cooling fluid outlet and a second charge air cooler having a second end face provided with a second cooling fluid inlet and a second cooling fluid outlet. Specifically, the second charge air cooler may be arranged adjacent to the first charge air cooler such that the first end face and the second end face are oriented in the same direction. Further, the charge air cooling unit may comprise a manifold unit connected to the first end face and the second end face. The manifold may be configured for guiding a cooling fluid through the first charge air cooler and the second charge air cooler.

By such an arrangement of the first and the second charge air cooler, the proposed charge air cooling unit enables a compact and less complex design of both the charge air coolers as well as the manifold unit. As to substance, by arranging the first charge air cooler and the second charge air cooler adjacent to one another, these components may be provided in the form of an assembly or module, thereby enabling a modular design which is less complex and easier to install and to maintain.

Further, as the first end face and the second end face are oriented in the same direction, the proposed arrangement enables that the manifold unit is connected to the assembly constituted or formed by the first and the second charge air cooler exclusively on one side. In this way, it may be avoided that connecting lines for supplying and/or discharging the cooling fluid are guided along different sides of the assembly, which may result in a complex structural arrangement of the manifold unit. Accordingly, the proposed configuration enables to decrease the necessary space for the manifold unit as well as its complexity. Thereby, the effort for a user for installing or maintaining the charge air cooling unit, i.e. the manifold unit, may be decreased. For example, when during maintenance operations it is required to uninstall the manifold unit, the proposed design may merely require that the manifold unit is accessible from one single side of the engine for ensuring a proper assembly or disassembly of the manifold unit.

The proposed charge air cooling unit may be employed in any suitable turbocharged internal combustion engine, i.e. turbocharged piston engine. For example, the internal combustion engine may be a large internal combustion engine, i.e. as utilized in power plants or in vessels as main or auxiliary engines.

Specifically, the charge air cooling unit may be employed in an internal combustion engines having a two-staged turbocharger. In such a configuration, the engine may comprise a low-pressure turbocharger unit and a high-pressure turbocharger unit through which intake air is subsequently guided and thereby compressed. Further, the internal combustion engine may be provided as a V-engine, in which both cylinder rows may have a low-pressure turbocharger unit, a high-pressure turbocharger unit and a charge air cooling unit, respectively.

The first charge air cooler and the second charge air cooler may be associated to different stages of the two-staged turbocharger. For example, the first charge air cooler may be associated to the low-pressure turbocharger unit such that intake air, after being guided through the compressor of the low-pressure turbocharger unit, flows through the first charge air cooler. In this way, intake air suctioned into an air intake line of the engine, at first, is guided through the low-pressure turbocharger unit. Upon passing the compressor of the low-pressure turbocharger unit, the intake air is charged, i.e. compressed, to a first pressure level and thereby heated. Then, the charge air is guided through the first charge air cooler and thereby cooled.

The second charge air cooler may be associated to the high-pressure turbocharger unit such that charge air discharged from the first charge air cooler is subsequently directed through the high-pressure turbocharger unit and the second charge air cooler. Specifically, in this way, cooled charge air discharged from the first charge air cooler, upon flowing through the high-pressure turbocharger unit, is further charged or compressed to a second pressure level higher than the first pressure level and thereby heated. Thereafter, the charge air at high pressure is guided through the second charge air cooler and thereby cooled.

Alternatively, the first charge air cooler may be associated to the high-pressure turbocharger unit and the second charge air cooler may be associated to the low-pressure turbocharger unit.

The first charge air cooler and the second charge air cooler may be configured to transfer cooling energy from the cooling fluid to the charge air by guiding both the cooling fluid and the charge air through the respective charge air cooler. For example, the first charge air cooler and the second charge air cooler may be provided in the form of a heat exchanger, respectively.

The cooling fluid flowing through the first charge air cooler and the second charge air cooler may be any suitable cooling medium capable of providing cooling energy, i.e. heat or thermal absorption, upon flowing therethrough. For example, the cooling fluid may be water. The cooling fluid may circulate through a cooling cycle connected to the manifold unit. In such a configuration, the cooling fluid, upon flowing through the manifold unit, may be guided through the first charge air cooler and/or the second charge air cooler.

Specifically, the manifold unit may be configured to guide the cooling fluid subsequently through the first charge air cooler and the second charge air cooler, or vice versa. In other words, the first charge air cooler and the second charge air cooler may be provided in series in a cooling fluid line, through which the cooling fluid circulates. Alternatively, the manifold unit may be configured to guide the cooling fluid in parallel through the first charge air cooler and the second charge air cooler. In other words, the first charge air cooler and the second charge air cooler may be provided in parallel in the cooling fluid line.

The first charge air cooler and the second charge air cooler may be provided in a stacked arrangement. In other words, the first charge a cooler in the second charge air cooler may be stacked. This may mean that, in an installed state, in which the charge air cooler together with the two-staged turbocharger is installed on the engine, the first charge air cooler and the second charge air cooler may be disposed one above the other, i.e. along a height axis of the engine. For example, the second charge air cooler may be disposed onto the first charge air cooler, or vice versa.

Alternatively or additionally, the first charge air cooler and the second charge air cooler may be arranged in parallel.

In the proposed charge air cooling unit, the first end face may be oriented in a direction away from the second charge air cooler. In other words, the first end face of the first charge air cooler may be arranged at an outer surface of the assembly or module formed by the first and the second charge air cooler assembled together. Further, the second end face may be oriented in a direction away from the first charge air cooler. Accordingly, the second end face of the second charge air cooler may be arranged at an outer surface of the assembly or module formed by the first and the second charge air cooler assembled together. The first end face of the first charge air cooler and the second end face of the second charge air cooler may be provided on one side of the module or assembly formed or constituted by the first and the second charge air cooler assembled together.

Alternatively or additionally, the charge air cooling unit may be configured to guide a first charge air stream through the first charge air cooler and a second charge air stream for the second charge air cooler, wherein the first charge air stream flows through the first charge air cooler in a direction opposite to a flow direction of the second charge air stream through the second charge air cooler. In other words, the charge air flow direction among the different charge air coolers is reversed. By such a configuration, the stacked arrangement of the first and second charge air cooler is enabled, while ensuring that the first end face and the second end face and consequently the first and second cooling fluid inlet and cooling fluid outlet are arranged exclusively on one side of the arrangement.

The manifold unit may comprise a first manifold connected to the first end face of the first charge air cooler. Specifically, the first manifold may be configured to guide cooling fluid supplied by a first cooling fluid supply line into the first cooling fluid inlet of the first charge air cooler. In other words, the first manifold fluid-communicatively connects the first cooling fluid supply line to the first charge air cooler, in particular the first cooling fluid inlet. The first cooling fluid supply line may be configured to supply cooling fluid circulating through the cooling cycle to the first and/or the second charge air cooler.

Further, the first manifold may be configured to guide cooling fluid discharged from the first cooling fluid outlet toward a first cooling fluid discharge line. In other words, the first manifold fluid-communicatively connects the first charge air cooler, in particular the first cooling fluid outlet, to the first cooling fluid discharge line. The first cooling fluid discharge line may be configured to supply cooling fluid discharged from the first charge air cooler into the cooling cycle so as to circulate therethrough.

Specifically, the first manifold may be provided with a first supply channel configured to guide, in particular deflect, cooling fluid supplied into the first manifold from the first cooling fluid supply line to the first cooling fluid inlet. In addition, the first manifold may be provided with a second supply channel configured to guide, in particular deflect, cooling fluid supplied into the first manifold from the first cooling fluid outlet toward the first cooling fluid discharge line. The first and/or the second supply channel of the first manifold may constitute a flow section for the cooling fluid within the first manifold. Further, the first and/or the second supply channel of the first manifold may comprise a curved section for deflecting the cooling fluid flowing therethrough. For example, the curved section may be configured to deflect the cooling fluid stream flowing through the first manifold by 90°, i.e. by substantially 90°.

Further, the first manifold may be configured to guide cooling fluid supplied by the first cooling fluid supply line toward the second charge air cooler. In this way, the first manifold may constitute a further flow section of the cooling fluid to be supplied to the second charge air cooler. To that end, the first manifold may be configured to guide cooling fluid discharged from the second charge air cooler toward the first cooling fluid discharge line. Accordingly, the first manifold may constitute a further flow section of the cooling fluid discharged from the second charge air cooler in direction of the first cooling fluid discharge line.

Specifically, the first manifold may be provided with a first transition channel, in particular a straight channel, configured to guide cooling fluid supplied to the first manifold from the first cooling fluid supply line toward the second charge air cooler. In other words, the first transition channel may be configured to fluid-communicatively connect the first cooling fluid supply line to the second charge air cooler. To that end, the first manifold may be provided with a second transition channel, in particular a straight channel, configured to guide cooling fluid discharged from the second charge air cooler toward the first cooling fluid discharge line. Thus, the second transition channel may be configured to fluid-communicatively connect the second charge air cooler to the first cooling fluid discharge line.

The manifold unit may further comprise a second manifold connected to the second end face of the second charge air cooler. The second manifold may be configured to guide cooling fluid supplied by the first cooling fluid supply line to the second cooling fluid inlet. Further, the second manifold may be configured to guide cooling fluid discharged from the second cooling fluid outlet toward the first cooling fluid discharge line. Specifically, the second manifold may be provided with a first supply channel configured to guide, in particular deflect, cooling fluid supplied into the second manifold from the first cooling fluid supply line, in particular via the first transition channel of the first manifold, to the second cooling fluid inlet. Further, the second manifold may be provided with a second supply channel configured to guide, in particular deflect, cooling fluid supplied into the second manifold from the second cooling fluid outlet toward the first cooling fluid discharge line, in particular via the second transition channel. The first and/or the second supply channel of the second manifold may constitute a flow section for the cooling fluid within the second manifold. Further, the first and/or the second supply channel of the second manifold may comprise a curved section for deflecting the cooling fluid flowing therethrough. For example, the curved section may be configured to deflect the cooling fluid stream flowing through the second manifold by 90°, i.e. by substantially 90°.

In a further development, the second manifold may be identical in construction compared to the first manifold. Accordingly, the second manifold may also comprise a first and a second transition channel. For example, the first transition channel of the second manifold may be configured to fluid-communicatively connect the first transition channel of the first manifold to the first supply channel of the second manifold and thus to the second cooling fluid inlet of the second charge air cooler. For doing so, a connecting element, in particular in the form of a U-shaped pipe, may be provided for fluid-communicatively connecting a discharge opening of the transition channel of the second manifold with an inlet opening of the first supply channel of the second manifold.

In a further development, the charge air cooling unit may comprise a connecting portion arranged between the first and the second manifold. The connecting portion may be releasably fastened to the first and the second manifold.

Further, the connecting portion may be designed and configured to fluid-communicatively connect the transition channels of the first manifold to the supply and/or transition channels of the second manifold. Specifically, the connecting portion may comprise a first connecting line for fluid-communicatively connecting the first transition channel of the first manifold to the first supply channel of the second manifold, in particular via the first transition channel of the second manifold. Additionally or alternatively, the connecting portion may comprise a second connecting line for fluid-communicatively connecting the second supply channel of the second manifold with the second transition channel of the first manifold.

By providing the connecting portion to be releasably fastened to the first and the second manifold, the proposed charge air cooling unit, i.e. the manifold unit, can be assembled and disassembled with less effort. For example, if only one of the first and the second charge air cooler is to be removed from the turbocharger, a user may release the connecting portion between the first and the second manifold and thereafter deinstall the charge air cooler to be removed, while the respective manifold may maintain fastened to the charge air cooler. In this way, compared to known arrangements, it is not required to completely deinstall a cooling fluid piping system so as to ensure a good accessibility to the charge air cooler and to release the charge air cooler from the charge air cooling unit.

In a further development, the first and/or the second charge air cooler may be configured to cool charge air flowing therethrough utilizing a first cooling fluid and a second cooling fluid. For example, the first and/or the second charge air cooler may be configured to cool the charge air flowing therethrough in two subsequent stages, wherein the first cooling fluid having a first temperature is used to cool the charge air in a first stage and thereafter, in a second stage, the second cooling fluid having a second temperature that is lower than the first temperature is used to cool the charge air discharged from the first stage. In this way, an effective and efficient cooling of charge air flowing through the first and the second charge air cooler may be ensured. The first cooling fluid and the second cooling fluid may circulate through separate cooling cycles, respectively. The first cooling fluid may be supplied to and discharged from the manifold unit by means of the first cooling fluid supply line and the first cooling fluid discharge line, wherein the second cooling fluid may be supplied to and be discharged from the manifold unit by means of a second cooling fluid supply line and a second cooling fluid discharge line, or vice versa.

Specifically, the first end face of the first charge air cooler may be further provided with a third cooling fluid inlet and a third cooling fluid outlet. For example, the first cooling fluid inlet and the first cooling fluid outlet of the first end face may be configured to direct the first cooling fluid through the first charge air cooler, wherein the third cooling fluid inlet and the third cooling fluid outlet of the first end face may be configured to direct the second cooling fluid, in particular having a lower temperature compared to the first cooling fluid, through the first charge air cooler, or vice versa.

Accordingly, the first manifold may be configured to guide cooling fluid supplied by a second cooling fluid supply line to the third cooling fluid inlet and to guide cooling fluid discharged from the third cooling fluid outlet toward a second cooling fluid discharge line. In particular, the first manifold may be provided with a third supply channel configured to guide, in particular deflect, cooling fluid supplied into the first manifold from the second cooling fluid supply line to the third cooling fluid inlet. Further, the first manifold may comprise a fourth supply channel configured to guide, in particular deflect, cooling fluid supplied into the first manifold from the third cooling fluid outlet toward the second cooling fluid discharge line.

For ensuring a compact design of the manifold unit, the first manifold may further be configured to guide cooling fluid supplied by the second cooling fluid supply line toward the second charge air cooler and to guide cooling fluid discharged from the second charge air cooler toward the second cooling fluid discharge line. Specifically, the first manifold may be provided with a third supply channel, in particular a straight channel, configured to guide cooling fluid supplied to the first manifold from the second cooling fluid supply line toward the second charge air cooler. Further, the first manifold may be provided with a fourth supply channel configured to guide cooling fluid discharged from the second charge air cooler toward the second cooling fluid discharge line.

Accordingly, the second end face may be provided with a fourth cooling fluid and a fourth cooling fluid outlet. For example, the second cooling fluid inlet and the second cooling fluid outlet of the second end face may be configured to direct the first cooling fluid through the second charge air cooler, wherein the fourth cooling fluid inlet and the fourth cooling fluid outlet of the second end face may be configured to direct the second cooling fluid, in particular having a lower temperature compared to the first cooling fluid, through the second charge air cooler, or vice versa.

The second manifold may be further configured to guide cooling fluid supplied by the second cooling fluid supply line to the fourth cooling fluid inlet and to guide cooling fluid discharged from the fourth cooling fluid outlet toward the second cooling fluid discharge line. In particular, the second manifold may be provided with a third supply channel configured to guide, in particular deflect, cooling fluid supplied into the second manifold from the second cooling fluid supply line, in particular via the third transition channel of the first manifold, to the fourth cooling fluid inlet. Further, the second manifold may be provided with a fourth supply channel configured to guide, in particular deflect, cooling fluid supplied into the second manifold from the fourth cooling fluid outlet toward the second cooling fluid discharge line, in particular via the fourth transition channel.

As set forth above, the second manifold may be identical in construction compared to the first manifold. The second manifold may comprise a third and a fourth transition channel. For example, the third transition channel of the second manifold may be configured to fluid-communicatively connect the third transition channel of the first manifold to the third supply channel of the second manifold and thus to the fourth cooling fluid inlet of the second end face. For doing so, a further connecting element, in particular in the form of a U-shaped pipe, may be provided for fluid-communicatively connecting a discharge opening of the third transition channel of the second manifold with an inlet opening of the third supply channel of the second manifold.

The connecting portion provided between the first and the second manifold may further comprise a third connecting line for fluid-communicatively connecting the third supply channel of the first manifold to the third supply channel of the second manifold. Further, the connecting portion may be provided with a fourth connecting line for fluid-communicatively connecting the fourth supply channel of the second manifold with the fourth transition channel of the first manifold.

In a further development, the supply channels of the first and/or the second manifold may be provided in the form of a T-piece channel having three openings. In this configuration, at least one of the three openings of each one of the supply channels is locked, in particular by means of a sealing cap. In this way, the proposed charge air cooling unit enables that the first manifold and the second manifold are identical in construction, thereby providing a simple and cost-efficient design.

Additionally or alternatively, the supply channels provided in the first and/or the second manifold may extend along a first plane. In other words, a longitudinal axis of the supply channels of the first and/or the second manifold may be arranged in the first plane. The first plane may be parallel to the first end face and/or the second end face. Further, the transition channels of the first and/or the second manifold may extend along a second plane parallel to the first plane. In other words, a longitudinal axis of the transition channels of the first and/or second manifold may be arranged within the second plane. Specifically, the first plane may be arranged between the second plane and the first and/or second end face. In other words, the first plane is interposed between the second plane and the first and/or second charge air cooler.

INDUSTRIAL APPLICABILITY

With reference to the Figures and in operation, a charge air cooling unit 20 for a two-staged turbocharger 10 for use in an internal combustion engine is suggested. The charge air cooling unit 20 comprises a first charge air cooler 22 having a first end face 62 provided with a first cooling fluid inlet HI1 and a first cooling fluid outlet HO1 and a second charge air cooler 24 having a second end face 64 provided with a second cooling fluid inlet HI2 and a second cooling fluid outlet HO2. Specifically, the second charge air cooler 22 is arranged adjacent to the first charge air cooler 24 such that the first end face 62 and the second end face 64 are oriented in the same direction. Further, the charge air cooling unit 20 comprises a manifold unit 52 connected to the first end face 62 and the second end face 64 for guiding a cooling fluid through the first charge air cooler 22 and the second charge air cooler 24.

The charge air cooling unit 20 as mentioned above is applicable in two-staged turbochargers 10 of an internal combustion engines. It may replace conventional charge air cooling units and may serve as a replacement or retrofit part.

The invention claimed is:

1. A charge air cooling unit for a two-staged turbocharger of an internal combustion engine, comprising:
 a first charge air cooler having a first end face provided with a first cooling fluid inlet (HI1) and a first cooling fluid outlet (HO1),
 a second charge air cooler having a second end face provided with a second cooling fluid inlet (HI2) and a second cooling fluid outlet (HO2), wherein the second charge air cooler is arranged adjacent to the first charge air cooler such that the first end face and the second end face are oriented in the same direction, and
 a manifold unit configured to guide a cooling fluid through the first and the second charge air cooler, the manifold unit including:
  a first manifold connected to the first end face and configured to guide cooling fluid supplied by a first cooling fluid supply line into the first cooling fluid inlet (HI1), and
  a second manifold connected to the second end face and configured to guide cooling fluid supplied by the first cooling fluid supply line to the second cooling fluid inlet (HI2),
 wherein the first manifold is configured to guide cooling fluid discharged from the first cooling fluid outlet (HO1) toward a first cooling fluid discharge line,
 wherein the first manifold is provided with a first supply channel configured to guide cooling fluid supplied into the first manifold from the first cooling fluid supply line to the first cooling fluid inlet (HI1) and a second supply channel configured to guide cooling fluid supplied into the first manifold from the first cooling fluid outlet (HO1) toward the first cooling fluid discharge line,
 wherein the first manifold is further configured to guide cooling fluid supplied by the first cooling fluid supply line toward the second charge air cooler and to guide cooling fluid discharged from the second charge air cooler toward the first cooling fluid discharge line, wherein the first manifold is provided with a first transition channel configured to guide cooling fluid supplied into the first manifold from the first cooling fluid supply line toward the second charge air cooler and a second transition channel configured to guide cooling fluid discharged from the second charge air cooler toward the first cooling fluid discharge line.

2. The charge air cooling unit according to claim 1, wherein the first charge air cooler and the second charge air cooler are stacked and/or arranged in parallel.

3. The charge air cooling unit according to claim 1, wherein the first end face is oriented in a direction away from the second charge air cooler, and wherein the second end face is oriented in a direction away from the first charge air cooler.

4. The charge air cooling unit according to claim 1, which is configured to guide a first charge air stream through the first charge air cooler and a second charge air stream through the second charge air cooler, wherein the first charge air stream flows through the first charge air cooler in a direction opposite to a flow direction of the second charge air stream through the second charge air cooler.

5. The charge air cooling unit according to claim 1, wherein the second manifold is configured to guide cooling fluid discharged from the second cooling fluid outlet (HO2) toward the first cooling fluid discharge line, wherein the second manifold is provided with a first supply channel configured to guide cooling fluid supplied into the second manifold from the first cooling fluid supply line, via the first transition channel of the first manifold, to the second cooling fluid inlet (HI2) and a second supply channel configured to guide cooling fluid supplied into the second manifold from the second cooling fluid outlet (HO2) toward the first cooling fluid discharge line, via the second transition channel of the first manifold.

6. The charge air cooling unit according to claim 5, further comprising a connecting portion arranged between the first and the second manifold and having:
   a first connecting line for fluid-communicatively connecting the first transition channel of the first manifold to the first supply channel of the second manifold, and/or
   a second connecting line for fluid-communicatively connecting the second supply channel of the second manifold to the second transition channel of the first manifold.

7. The charge air cooling unit according to claim 6, wherein the first end face is provided with a third cooling fluid inlet (LI1) and a third cooling fluid outlet (LO1), wherein
   the first manifold is further configured to guide cooling fluid supplied by a second cooling fluid supply line to the third cooling fluid inlet (LI1) and to guide cooling fluid discharged from the third cooling fluid outlet (LO1) toward a second cooling fluid discharge line, wherein
   the first manifold is provided with a third supply channel configured to guide cooling fluid supplied into the first manifold from the second cooling fluid supply line to the third cooling fluid inlet (LI1) and a fourth supply channel configured to guide cooling fluid supplied into the first manifold from the third cooling fluid outlet (LO1) toward the second cooling fluid discharge line.

8. The charge air cooling unit according to claim 7, wherein the first manifold is further configured to guide cooling fluid supplied by the second cooling fluid supply line toward the second charge air cooler and to guide cooling fluid discharged from the second charge air cooler toward the second cooling fluid discharge line, wherein the first manifold is provided with a third transition channel configured to guide cooling fluid supplied into the first manifold from the second cooling fluid supply line toward the second charge air cooler and a fourth transition channel configured to guide cooling fluid discharged from the second charge air cooler toward the second cooling fluid discharge line.

9. The charge air cooling unit according to claim 8, wherein the second end face is provided with a fourth cooling fluid inlet (LI2) and a fourth cooling fluid outlet (LO2), wherein
   the second manifold is further configured to guide cooling fluid supplied by the second cooling fluid supply line to the fourth cooling fluid inlet (LI2) and to guide cooling fluid discharged from the fourth cooling fluid outlet (LO2) toward the second cooling fluid discharge line, wherein
   the second manifold is provided with a third supply channel configured to guide cooling fluid supplied into the second manifold from the second cooling fluid supply line, via the third transition channel of the first manifold, to the fourth cooling fluid inlet (LI2) and a fourth supply channel configured to guide cooling fluid supplied into the second manifold from the fourth cooling fluid outlet (LO2) toward the second cooling fluid discharge line, via the fourth transition channel of the first manifold.

10. The charge air cooling unit according to claim 9, wherein the connecting portion further comprises:
    a third connecting line for fluid-communicatively connecting the third transition channel of the first manifold to the third supply channel of the second manifold, and/or
    a fourth connecting line for fluid-communicatively connecting the fourth supply channel of the second manifold to the fourth transition channel of the first manifold.

11. The charge air cooling unit according to claim 5, wherein the supply channels of the first and/or the second manifold are provided in the form of a T-piece channel having three openings, and wherein one of the three openings of the T-piece channel are locked.

12. The charge air cooling unit according to claim 5, wherein the supply channels provided in the first and/or the second manifold extend along a first plane (A-A) and the transition channels of the first and/or the second manifold extend along a second plane (C-C), and wherein the first plane (A-A) is arranged closer to the first and/or second end face compared to the second plane (C-C).

* * * * *